Oct. 4, 1932.	H. NISHIHARA	1,881,288
AUTOMOBILE BRAKE
Filed May 21, 1931
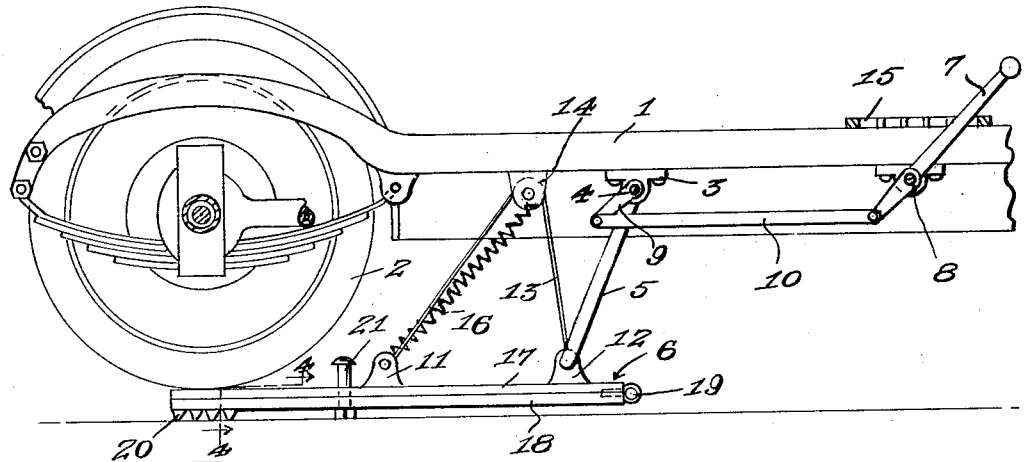
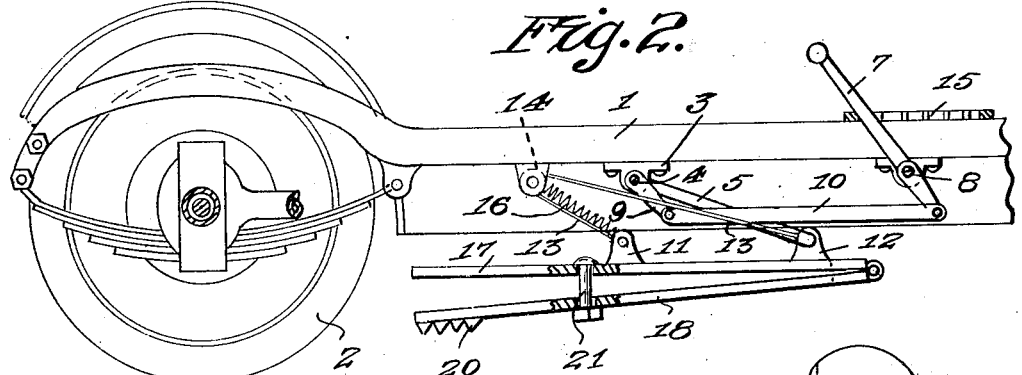
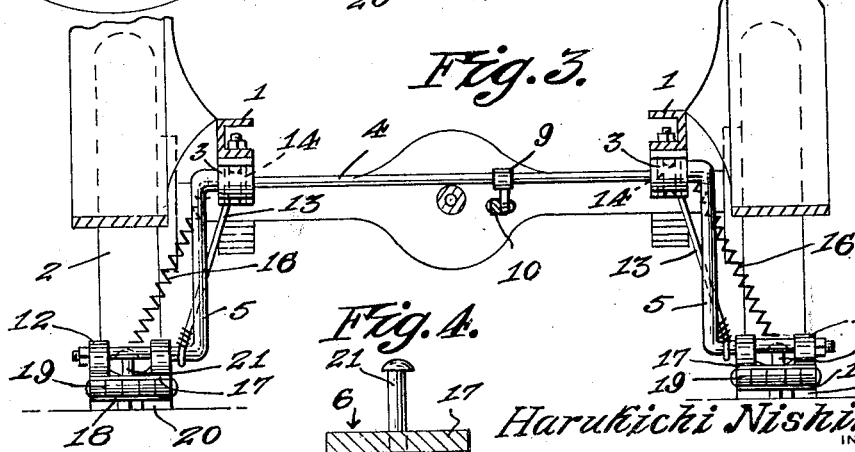
Harukichi Nishihara, INVENTOR
BY Victor J. Evans and Co. ATTORNEY Patented Oct. 4, 1932

1,881,288

UNITED STATES PATENT OFFICE

HARUKICHI NISHIHARA, OF WAIMANALO, OAHU, TERRITORY OF HAWAII

AUTOMOBILE BRAKE

Application filed May 21, 1931. Serial No. 539,073.

This invention relates to brakes for motor vehicles especially adapted for application to any form of vehicle wherein it is desired to have a brake capable of stopping the vehicle in a very limited distance and has for the primary object, the provision of a device of the above stated character which will disengage the drive wheels of the vehicle from the ground and assume the weight of the vehicle so as to bring the vehicle to a quick stop without danger of skidding.

Another object of this invention is the provision of a brake of the above stated character which will be simple, durable and efficient and which may be manufactured and sold at a comparatively low cost.

With these and other objects in view, this invention consists in certain novel features of construction, combination and arrangement of parts to be hereinafter more fully described and claimed.

For a complete understanding of my invention, reference is to be had to the following description and accompanying drawing, in which:

Figure 1 is a fragmentary vertical sectional view illustrating a motor vehicle with a brake applied thereto and constructed in accordance with my invention.

Figure 2 is a similar view illustrating the brake in an inactive position.

Figure 3 is a transverse sectional view illustrating the mounting of the brake on the frame of the vehicle.

Figure 4 is a detail sectional view taken on the line 4—4 of Figure 1.

Referring in detail to the drawing, the numeral 1 indicates a chassis of a motor vehicle having the usual rear or drive wheels 2 adapted to be moved out of engagement with the ground when desiring to bring the vehicle to a quick stop with my invention.

Journals 3 are secured to the chassis 1 and have journalled therein a transversely arranged shaft 4, the ends of which are formed into crank arms 5 to which are journalled brake shoes 6. An operating lever 7 is pivoted to the chassis 1 as shown at 8 and is connected to an arm 9 secured to the shaft 4 by a link 10 for the purpose of raising and lowering the crank arms to position the brake shoes 6 in engagement with the ground as shown in Figure 1 or to position the brake shoes in an elevated position as shown in Figure 2.

Ears 11 and 12 are carried by the shoes 6 and have secured thereto the ends of flexible elements 13 which are trained over groove pulleys 14 carried by the chassis 1, so that when the lever 7 is moved rearwardly as shown in Figure 2, the brake shoes will be moved into an elevated position and when the lever 7 is moved forwardly, the flexible elements cause the brake shoes to engage the ground and in engagement with the peripheries of the wheels so that said wheels due to the momentum of the vehicle will ride up on the brake shoes causing a quick stop of the vehicle. A serrated plate 15 is carried by the chassis 1 for the purpose of holding the lever 7 in any of its adjusted positions. Coil springs 16 are connected to the ears 11 and to the brackets which support the pulleys 14 to the chassis for the purpose of aiding in moving the brake shoes into an elevated or inactive position as shown in Figure 2. The ears 12 form journals for the crank arms 5.

Each brake shoe includes upper and lower plates 17 and 18 hinged together at their forward ends as shown at 19. The upper plate 17 is adapted to engage the wheel when in a brake applying position while the plate 18 engages the ground. A portion of the plate 18 may have a lining of rubber or other suitable material secured thereto and which is serrated as shown at 20 to prevent skidding of the vehicle when the brake shoes are lowered into engagement with the ground and the wheels 2 thereon.

The plates 17 and 18 of each shoe are apertured to slidably receive a fastener 21 for the purpose of limiting the movement of said plates away from each other.

From the foregoing description taken in connection with the accompanying drawing it will be noted that a very efficient brake has been provided which can be easily and quickly installed upon a motor vehicle and when brought into engagement with the ground between the latter and the wheels will bring the vehicle to a quick stop without the liability of skidding. It is further to be noted that when the brake is in an inactive position, the shoes are supported in an elevated position and clear of the ground so that they will not be interfered with by obstructions on the ground during the travel of the vehicle.

While I have shown and described the preferred embodiment of my invention it will be understood that minor changes in construction, combination and arrangement of parts may be made without departing from the spirit and scope of my invention, as claimed.

Having thus described my invention, what I claim is:

1. A brake for motor vehicles comprising elongated brake shoes arranged in advance of the drive wheels of a vehicle, journals on the shoes adjacent the forward ends thereof, an operating shaft journalled to the vehicle and having cranks received by the journals for raising and lowering the shoes, pulleys secured to the vehicle adjacent the operating shaft, ears on the shoes and located intermediate the ends thereof, and flexible elements trained over the pulleys and secured to said ears and journals for maintaining the shoes in substantially horizontal position when raised or lowered by said shaft.

2. A brake for motor vehicles comprising elongated brake shoes arranged in advance of the drive wheels of a vehicle, journals on the shoes adjacent the forward ends thereof, an operating shaft journalled to the vehicle and having cranks received by the journals for raising and lowering the shoes, pulleys secured to the vehicle adjacent the operating shaft, ears on the shoes and located intermediate the ends thereof, flexible elements trained over the pulleys and secured to said ears and journals for maintaining the shoes in substantially horizontal position when raised or lowered by said shaft, and coiled springs secured to the vehicle adjacent the pulleys and to the ears.

In testimony whereof I affix my signature.

HARUKICHI NISHIHARA.